US010820243B2

(12) United States Patent
Halepovic et al.

(10) Patent No.: US 10,820,243 B2
(45) Date of Patent: Oct. 27, 2020

(54) METHODS AND DEVICES FOR MANAGING VIDEO SESSIONS IN A NETWORK BASED ON NETWORK PERFORMANCE INFORMATION

(71) Applicant: AT&T Intellectual Property I, L.P., Atlanta, GA (US)

(72) Inventors: Emir Halepovic, Somerset, NJ (US); Harold Orr McCaskey, Alpharetta, GA (US); Kyung-Wook Hwang, Bedminster, NJ (US); Marco Platania, Short Hills, NJ (US); Rittwik Jana, Montville, NJ (US); Sarat Puthenpura, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/191,966

(22) Filed: Nov. 15, 2018

(65) Prior Publication Data

US 2019/0090170 A1   Mar. 21, 2019

Related U.S. Application Data

(63) Continuation of application No. 15/284,037, filed on Oct. 3, 2016.

(51) Int. Cl.
*H04W 36/16* (2009.01)
*H04W 36/32* (2009.01)
(Continued)

(52) U.S. Cl.
CPC .......... *H04W 36/165* (2013.01); *H04L 41/12* (2013.01); *H04L 43/08* (2013.01);
(Continued)

(58) Field of Classification Search
CPC ... H04W 36/165; H04W 4/029; H04W 24/08; H04W 4/08; H04W 36/32; H04L 41/12;
(Continued)

(56) References Cited

U.S. PATENT DOCUMENTS 6,266,514 B1   7/2001   O'Donnell et al.
6,285,875 B1   9/2001   Alajoki et al.
(Continued)

FOREIGN PATENT DOCUMENTS

CN   101401472 A   4/2009
CN   101595666 A   12/2009
(Continued)

OTHER PUBLICATIONS

"Discover mobile performance insights for the places that mean the most to you", http://www.rootmetrics.com/en-US/home/, Rootmetrics collates crowd sourced data about cellular carrier performance and displays the results on a zoomable map, right down to cell tower level., Apr. 9, 2016.
(Continued)

*Primary Examiner* — Charles N Appiah
*Assistant Examiner* — Nicole M Louis-Fils
(74) *Attorney, Agent, or Firm* — Guntin & Gust, PLC; Andrew Gust

(57) ABSTRACT

Aspects of the subject disclosure may include, for example, receiving network information for a group of video sessions. Embodiments include calculating an overall video traffic metric for the group of video sessions for each cell based on the network information and include determining a first overall video traffic metric of a first cell is above a first predetermined threshold and a second overall video traffic metric of a second cell is below the first predetermined threshold. Also, embodiments include generating a graphical map that indicates the overall video traffic metric for each
(Continued)

cell in the cellular network and sending the graphical map to a mobile device in the first cell showing first overall video traffic metric and the second overall video traffic metric relative to the first predetermined threshold. Other embodiments are disclosed.

20 Claims, 10 Drawing Sheets

(51) Int. Cl.
| | |
|---|---|
| H04W 24/08 | (2009.01) |
| H04L 29/08 | (2006.01) |
| H04L 12/26 | (2006.01) |
| H04W 4/08 | (2009.01) |
| H04W 4/029 | (2018.01) |
| H04L 12/24 | (2006.01) |
| H04W 36/22 | (2009.01) |

(52) U.S. Cl.
CPC ...... *H04L 43/0882* (2013.01); *H04L 43/0888* (2013.01); *H04L 67/36* (2013.01); *H04W 4/029* (2018.02); *H04W 4/08* (2013.01); *H04W 24/08* (2013.01); *H04W 36/32* (2013.01); *H04W 36/22* (2013.01)

(58) Field of Classification Search
CPC . H04L 43/08; H04L 43/0882; H04L 43/0888; H04L 67/36
USPC .......................................................... 455/438
See application file for complete search history.

(56) References Cited

U.S. PATENT DOCUMENTS

| | | | |
|---|---|---|---|
| 7,062,264 B2 | 6/2006 | Ko et al. | |
| 7,319,847 B2 | 1/2008 | Xanthos et al. | |
| 7,634,267 B2 | 12/2009 | Dobson et al. | |
| 7,855,977 B2 | 12/2010 | Morrison et al. | |
| 8,040,864 B2 | 10/2011 | Karaoguz et al. | |
| 8,509,761 B2 | 8/2013 | Krinsky et al. | |
| 8,682,255 B2 | 3/2014 | Rubin et al. | |
| 8,838,122 B2 | 9/2014 | Stamoulis et al. | |
| 9,113,345 B2 | 9/2015 | Griff | |
| 9,148,679 B2 | 9/2015 | Karaoguz | |
| 9,301,211 B2 | 3/2016 | Baillargeon | |
| 9,432,865 B1 | 8/2016 | Jadunandan et al. | |
| 9,603,158 B1* | 3/2017 | Ross | H04W 16/18 |
| 9,652,971 B1 | 5/2017 | Trundle | |
| 2009/0300688 A1* | 12/2009 | Karaoguz | H04N 21/23805 725/62 |
| 2012/0009890 A1* | 1/2012 | Curcio | H04L 29/06 455/230 |
| 2013/0308470 A1 | 11/2013 | Bevan et al. | |
| 2014/0155043 A1* | 6/2014 | Gell | H04W 4/60 455/414.1 |
| 2015/0319048 A1 | 11/2015 | Griff et al. | |
| 2015/0319664 A1* | 11/2015 | Perras | H04W 36/22 370/331 |
| 2015/0341226 A1 | 11/2015 | Griff et al. | |
| 2015/0341812 A1* | 11/2015 | Dion | H04W 24/08 370/252 |
| 2016/0174081 A1 | 6/2016 | Lau | |
| 2017/0030733 A1* | 2/2017 | Burton | G01C 21/3461 |
| 2018/0023968 A1* | 1/2018 | Stuchfield | G01C 21/3453 701/416 |
| 2018/0098256 A1 | 4/2018 | Halepovic et al. | |

FOREIGN PATENT DOCUMENTS

| | | |
|---|---|---|
| CN | 102404765 A | 4/2012 |
| EP | 810807 A2 | 12/1997 |
| EP | 1284579 A1 | 2/2003 |
| EP | 1361761 A1 | 11/2003 |
| WO | 2009034391 A1 | 3/2009 |

OTHER PUBLICATIONS

"Network Performance Reporting In SevOne", https://www.sevone.com/datasheet/network-performance-reporting-sevone, Discloses network performance monitoring with "status maps with physical and geographical layouts of your network"., May 7, 2016.

"Revolutionary network monitoring software with end-to-end visibility to pinpoint performance issues", http://www.solarwinds.com/network-performance-monitor/, Discloses a network performance monitoring and visualization software application., May 25, 2015.

"Spirent Epitiro", https://www.spirent.com/-/media/Brochures/Spirent_Epitiro.pdf,, Discloses an application that measures network performance indicators including Time-to-connect, speed, latency,etc where "geographical performance and coverage is displayed on color-coded grid maps with drill-down capability"., Jul. 14, 2016.

"Unbiased Wireless Network Information. From people just like you.", http://www.sensorly.com/, Collates crowd sourced performance data about network performance and matches it to a geographical location that can be displayed on a map., Feb. 7, 2010.

* cited by examiner

100

400

METHODS AND DEVICES FOR MANAGING VIDEO SESSIONS IN A NETWORK BASED ON NETWORK PERFORMANCE INFORMATION

CROSS REFERENCE TO RELATED APPLICATIONS

This application is a continuation of U.S. patent application Ser. No. 15/284,037 filed Oct. 3, 2016. The contents of the foregoing is hereby incorporated by reference into this application as if set forth herein in full.

FIELD OF THE DISCLOSURE

The subject disclosure relates to a methods and devices for managing video sessions in a network based on network performance information.

BACKGROUND

Modern communication networks, including the Internet, cellular networks and edge wireless networks (e.g. WiFi networks), allow users to conduct video sessions on mobile devices such as smartphones and tablet computers. Video sessions can include streaming video content as well as conducting video conferencing on mobile devices.

BRIEF DESCRIPTION OF THE DRAWINGS

Reference will now be made to the accompanying drawings, which are not necessarily drawn to scale, and wherein.

DETAILED DESCRIPTION

Figure 1:
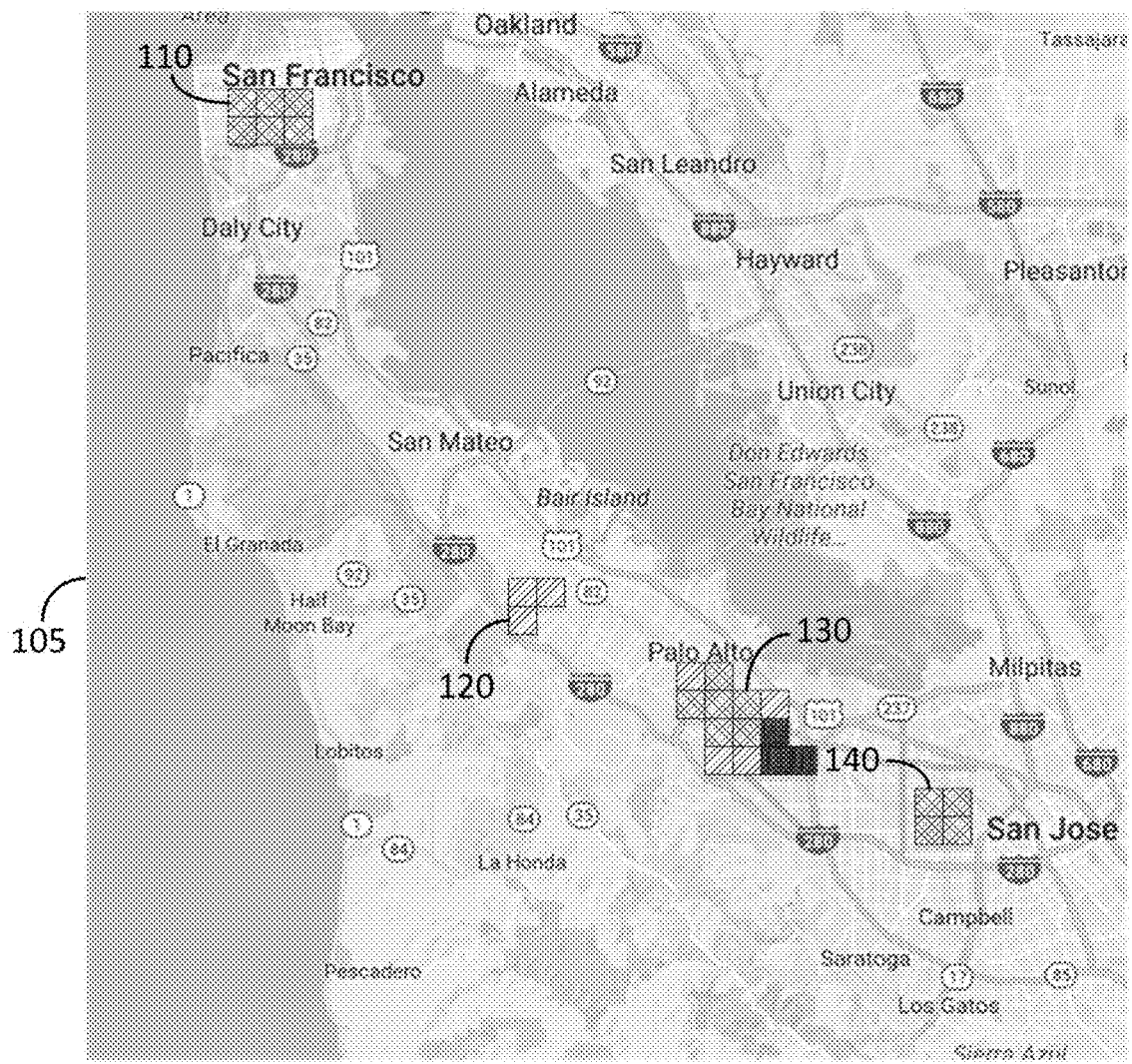
FIGS. 1-5 depict illustrative embodiments for managing video sessions in a network based on network performance information.

The subject disclosure describes, among other things, illustrative embodiments for managing video sessions in a network based on network information. Embodiments can include receiving aggregate network information for communication sessions for each cell of a multiple of cells in a cellular network. The communication sessions include a group of video sessions and the aggregate network information comprises network information from each of a multiple of data sources. Further embodiments include calculating an overall video traffic metric for the group of video sessions for each cell based on the aggregate network information. Additional embodiments include determining a first overall video traffic metric of a first group of video sessions controlled by a first base station of a first cell is above a first predetermined threshold and a second overall video traffic metric of a second group of video sessions controlled by a second base station of a second cell is below the first predetermined threshold. Also, embodiments include generating a graphical map of the cellular network that displays a geography of the cellular network and indicates the overall video traffic metric for the group of video sessions for each cell in the cellular network. Further embodiments include sending the graphical map to a mobile device conducting a video session in the first cell and an indication that the first overall video traffic metric associated with first cell is above the first predetermined threshold and the second overall video traffic metric associated with the second cell is below the first predetermined threshold. Other embodiments are described in the subject disclosure.

One or more aspects of the subject disclosure include a device. The device can include a processing system including a processor and a memory that stores executable instructions that, when executed by the processing system, facilitate performance of operations. Operations can include receiving aggregate network information for communication sessions for each cell of a plurality of cells in a cellular network. The communication sessions include a group of video sessions and the aggregate network information comprises network information from each of a multiple of data sources. Further operations can include calculating an overall video traffic metric for the group of video sessions for each cell based on the aggregate network information. Additional operations can include generating a graphical map of the cellular network that displays a geography of the cellular network and indicates the overall video traffic metric for the group of video sessions for each cell in the cellular network within the geography. Also, operations can include determining a first overall video traffic metric of a first group of video sessions controlled by a first base station of a first cell is above a first predetermined threshold and a second overall video traffic metric of a second group of video sessions controlled by a second base station of a second cell is below the first predetermined threshold. In some embodiments a threshold for a metric can be dynamic instead of predetermined. In other embodiments, the threshold for a metric can be relative to another metric or parameter of a network. Further operations can include sending the graphical map to a communication device and an indication that the first overall video traffic metric associated with first cell is above the first predetermined threshold and the second overall video traffic metric associated with the second cell is below the first predetermined threshold. Additional operations can include performing a handover of control of a first portion of the first group of video sessions from the first base station to the second base station responsive to receiving a message from the communication device. In some embodiments handover of control of video sessions can come from automated network control (e.g. from a centralized network device) or from a base station request. The message provides an indication to change control of the first portion of the first group of video session from the first base station to the second base station.

One or more aspects of the subject disclosure include a machine-readable storage medium, comprising executable instructions that, when executed by a processing system including a processor, facilitate performance of operations. The operation can include receiving aggregate network information for communication sessions for each cell of a plurality of cells in a cellular network. The communication sessions include a group of video sessions and the aggregate network information comprises network information from each of a plurality of data sources. Further operations can include calculating an overall video traffic metric for the group of video sessions for each cell based on the aggregate network information. Additional operations can include determining a first overall video traffic metric of a first group of video sessions controlled by a first base station of a first cell is above a first predetermined threshold and a second overall video traffic metric of a second group of video sessions controlled by a second base station of a second cell is below the first predetermined threshold. Also, operations can include receiving aggregate wireless network information for each of a plurality of wireless networks. Further operations can include calculating a wireless traffic metric for each of the plurality of wireless networks. Additional operations can include identifying a first wireless network of multiple wireless networks. The first wireless network has a first wireless traffic metric below a second predetermined threshold. Also, operations can include generating a graphical map of the cellular network that displays a geography of the cellular network, indicates the overall video traffic metric for the group of video sessions for each cell in the cellular network, displays a geography of the plurality of wireless networks, and indicates the wireless traffic metric for each of the plurality of wireless networks. Further operations can include sending the graphical map to a mobile device conducting a video session in the first cell and an indication that the first overall video traffic metric associated with first cell is above the first predetermined threshold, the second overall video traffic metric associated with the second cell is below the first predetermined threshold, and the first wireless traffic metric is below the second predetermined threshold.

One or more aspects of the subject disclosure include a method. The method can include receiving, by a processing system including a processor, aggregate network information for communication sessions for each cell of a plurality of cells in a cellular network. The communication sessions include a group of video sessions and wherein the aggregate network information comprises network information from each of a multiple of data sources. The method can further include calculating, by the processing system, an overall video traffic metric for the group of video sessions for each cell based on the aggregate network information. Additionally, the method can include determining, by the processing system, a first overall video traffic metric of a first group of video sessions controlled by a first base station of a first cell is above a first predetermined threshold and a second overall video traffic metric of a second group of video sessions controlled by a second base station of a second cell is below the first predetermined threshold. Also, the method can include generating, by the processing system, a graphical map of the cellular network that displays a geography of the cellular network and indicates the overall video traffic metric for the group of video sessions for each cell in the cellular network. Further, the method can include sending, by the processing system, the graphical map to a mobile device conducting a video session in the first cell and an indication that the first overall video traffic metric associated with first cell is above the first predetermined threshold and the second overall video traffic metric associated with the second cell is below the first predetermined threshold.

FIG. 1 depicts an illustrative embodiment of managing video sessions in a network based on network information. In one or more embodiments, the system 100 includes a network server generating a graphical map 105 of a cellular network. The nonlimiting embodiment shown in FIG. 1, the graphical map 105 spans from San Francisco and San Jose. Portions of the graphical map 105 can show clusters of cells 110, 120, 130, 140 of the cellular network by using different pattern squares. Each square pattern can provide a range of values for an overall video traffic metric for the cell. Squares with certain patterns indicate cells with more congestion according to the overall video traffic metric than squares with other patterns. In other embodiments, the graphical map can be presented using Nanocube technology (see www.nanocube.net). Nanocube technology allows for fast visualization of large spatiotemporal datasets. Further, Nanocube technology processes data with respect to space, time, or data attributes, and presents the results in real-time on a web browser over heatmaps, bar charts, histograms, etc.

In one or more embodiments, the graphical map 105 can be sent by the network server to communication device of cellular network management personnel (e.g. cellular network operator) identifying more congested (i.e. more overall video traffic according to the overall video traffic metric) cells and less congested cells. The network operator communication device can be any computing device including, but not limited to, a desktop computer, laptop computer, tablet computer, smartphone, etc. The congestion of the cells may be due in part of video sessions conducted by mobile devices (e.g. smartphone, tablet computers, etc.). Video sessions can include a mobile device streaming video content or conducting a video conference. Moreover, based on identifying more congested cells and less congested cells, a network operator can change control of some mobile devices from a base station associated with a more congested cell to a base station associated with a less congested cell.

Examples of an overall video traffic metric for a cell can include number of communication sessions, number of video sessions, total data (MB), throughput (Kbps), transfer duration (sec), average video quality (Kbps), application or channel type (e.g. Hulu™, Netflix™, Youtube™, Skype™, etc.), operating system type (Android™, iOS™, etc.), rebuffering ratio (%), startup delay (seconds), quality switching, and network type (e.g. 2G, 3G, LTE, etc.). Metrics can be calculated or otherwise determined from network information receives from different sources. Network (performance) information can include physical network information of a cell including the signal strength of mobile devices and base station of a cell as well as the interference subjected to the signals in a cell. Signal strength and interference affect the number of retransmissions of packets for communications sessions such as video sessions. Other network information can include application information provided by a different data source. For example, application information can indicate the type of application used in a communication session or video session such as Hulu™, Netflix™, Youtube™, Skype™, etc. Additional network information can be the operating system type of mobile devices in a cell provided by a different data source. Other network information can include Transmission Control Protocol (TCP) flow level information that can include the number of retransmissions of packets for communication sessions or video sessions. Further, metrics such as throughput, total data, transfer duration, etc. are dependent on the number of retransmissions of packets and affect the congestion of cells.

In one or more embodiments, the system 100 can be configured to send the graphical map 105 indicating the congestion of each cell according to a selected overall video traffic metric to be presented on a communication device or mobile device. Further, the system 100 can be provisioned or have default settings for different thresholds of congestions, each threshold having a different metric value. In addition, the network server of system 100 can assign a color, pattern, or any other visual indicator for each cell being above and/or below a threshold value of the overall video traffic metric. For example, graphical map 105 can indicate the congestion of cells 110-140 according to the number of video sessions (i.e. overall video traffic metric). In a graphical map 105, if the number of video sessions in a cell is detected or determined to be 0-25 video sessions, then a square representing the cell in the graphical map can be colored green. If the number of video sessions in a cell is detected or determined to be 26-50 video sessions, the square representing the cell in the graphical map can be colored yellow. Further, if the number of video sessions is detected or determined to be 51-75 video sessions, the square representing the cell in the graphical map can be colored orange. In addition, if the number of video sessions is detected or determined to be between 76-100 video sessions, the square representing the cell in the graphical map can be colored red.

In one or more embodiments, the system 100 can include one or more network servers and can send the graphical map 105 to a communication device of a network operator to be presented on a display. Further, the network server can provide an indication to the communication device that one cell is congested due to a high value of an overall video traffic metric for the cell and another cell is less congested due to lower value of the overall video traffic metric for the other cell. In addition, the indication can include information that one or more mobile devices in the one cell can be configured to connect to the other cell to relieve some congestion in the one cell. For example, the number of video sessions in a first cell is 53 sessions and the number of video sessions for a second cell is 42 sessions. A predetermined threshold for a congestion for the overall video traffic metric (i.e. number of video sessions) can be 50 video sessions. Further, five mobile devices from the first cell can be provisioned to be connected to the second cell.

In one or more embodiments, a network operator can provide a message that instructs the network server to provision the connection of the one or more mobile devices from the one cell to the other cell. Consequently, the network server can instruct a base station of the one cell to perform or cause to perform a handover of control of the one or more mobile device to a base station of the other cell. For example, the network operator, via their communication device, can send instructions to the network server to have the base station of the first cell perform or cause to perform a handover of control of the five mobile devices to the base station of the second cell. When the handover of the five mobile devices is complete, then the first cell has 48 video sessions and the second cell has 47 video sessions, thereby each cell being below a predetermined threshold of congestion of 50 video sessions.

In one or more embodiments, the network server can send the graphical map 105 to one of the mobile devices in a congested cell to be presented on a display. Further, the network server can provide an indication to the mobile device that it is connected to a congested cell (according to an overall video traffic metric) and provide an indication that the mobile device can be connected to another, less congested cell. For example, the number of video sessions in a congested cell is 53 sessions and the number of video sessions for a less congested cell is 42 sessions. A predetermined threshold for congestion according to an overall video traffic metric (i.e. number of video sessions) can be 50 video sessions. Further, five mobile devices from the first cell can be provisioned to be connected to the second cell.

The network server can send each of these five mobile devices the graphical map 105 and/or an indication that they are each connected to a congested cell but can connect to a less congested cell to possibly improve the quality of their respective video sessions. In some embodiments, three of the five mobile devices may connect to the less congested cell and send a message to the network server to perform or cause to perform a handover of control of their respective mobile devices from the base station of the congested cell to the base station of the less congested cell. In addition, the users of the two other mobile devices may decide not to connect to the less congested cell because they have determined, by examining the graphical map 105, that they are traveling away from the less congested cell.

In one or more embodiments, the system 100 can determine one cell is congested due to a high value of an overall video traffic metric for the cell (e.g. above a predetermined threshold) and another cell is less congested due to lower value of the overall video traffic metric for the other cell (e.g. below a predetermined threshold). In addition, the network server can determine that one or more mobile devices in the one cell can be provisioned to connect to the other cell to relieve some congestion of the one cell. Responsive to this determination, the network server can automatically perform or cause to perform a handover of control of the one or more mobile devices from base station of the one cell to the base station of the other cell, thereby reducing the congestion of the one cell. For example, the number of video sessions in a first cell can be 53 sessions and the number of video sessions for a second cell is 42 sessions. A predetermined threshold for an overall video traffic metric (i.e. number of video sessions) can be 50 video sessions. Further, five mobile devices from the first cell can be provisioned to be connected to the second cell. The network server can perform or cause to perform a handover of control of the five mobile devices from the base station of the first cell to the base station of the second cell, thereby decreasing congestion in the first cell.

In one or more embodiments, the network server can use image recognition to determine a congested cell (i.e. overall video traffic metric above a predetermined threshold) and a less congested cell (i.e. overall video traffic metric below a predetermined threshold). Further, the network server can determine one or more mobile devices connected to the congested cell can also be connected to the less congested cell. Responsive to this determination, the network server can automatically perform or cause to perform a handover of control of the one or more mobile devices from a base station of the congested cell to the base station of the less congested cell, thereby reducing the congested cell. For example, the number of video sessions in a first cell can be 53 sessions and the number of video sessions for a second cell is 42 sessions. A predetermined threshold for an overall video traffic metric (i.e. number of video sessions) can be 50 video sessions. A square representing the first cell can be colored red on the graphical map 105 to indicate the level of congestion (i.e. metric) in the first cell is above a predetermined threshold. Further, a square representing the second cell can be colored green on the graphical map 105 to indicate the level of congestion (i.e. metric) in the second cell is below a predetermined threshold. Further, the network server can determine five mobile devices from the first cell can be provisioned to be connected to the second cell. The network server can perform or cause to perform a handover of control of the five mobile devices from the base station of the first cell to the base station of the second cell, thereby decreasing congestion in the first cell.

Figure 2:
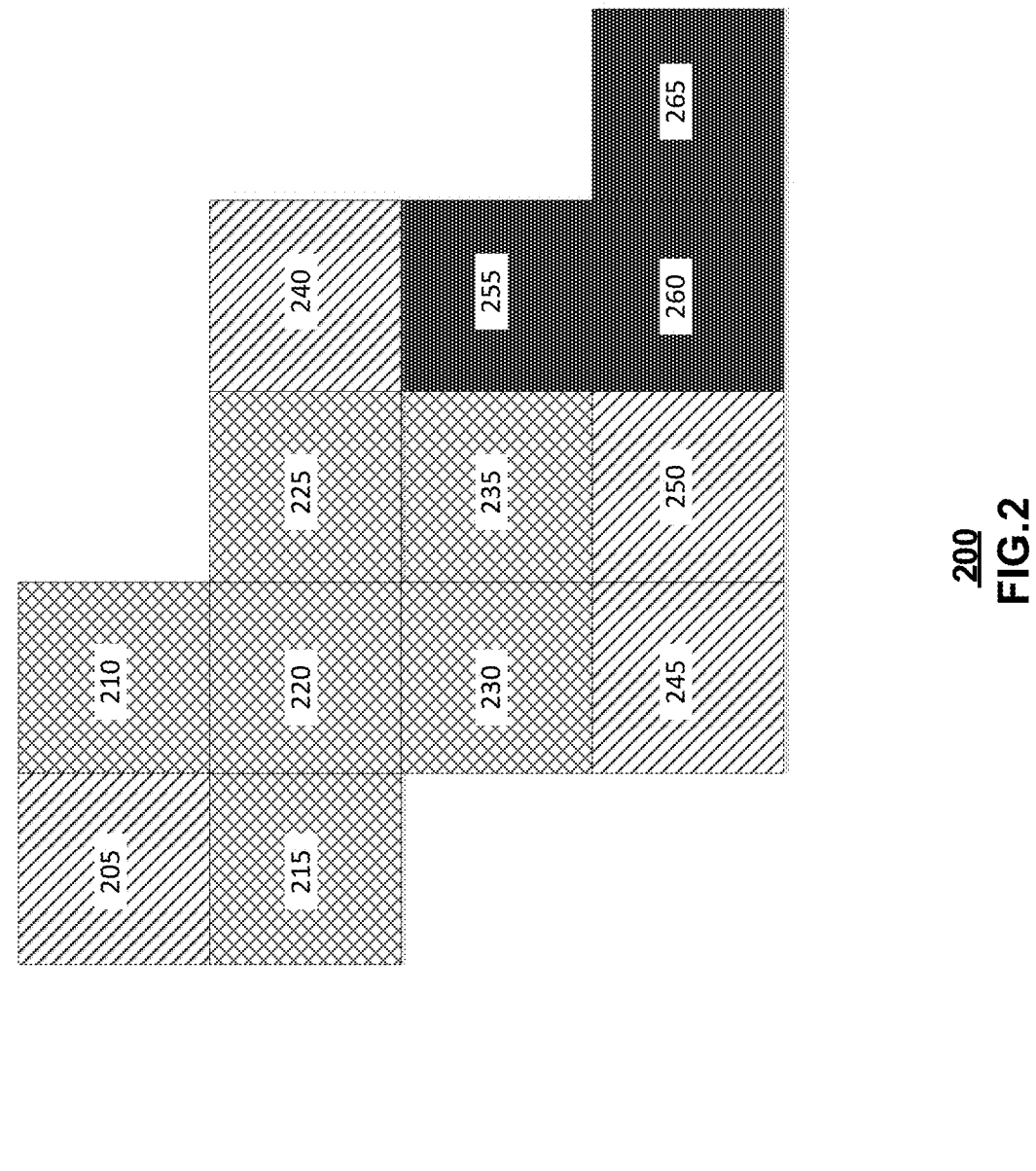

FIG. 2 depicts a cell cluster 130 of the cellular network from graphical map 105. In one or more embodiments, each square 205-265 represents a cell in a cellular network. Further, each square 205-265 has a pattern to indicate a range values for congestion according to an overall video traffic metric. Squares 205, 240, 245, 250 with a single diagonal line pattern may indicate a low range of congestion. Further, squares 210-235 with a two diagonal line pattern may indicate an intermediate range of congestion. In addition, squares 255-265 with a cross hatching pattern may indicate a high range of congestions. For example, squares 205, 240, 245, 250 with a single diagonal line pattern may indicate cells with a number of video sessions between 0-30 video sessions. Further, squares 210-235 with a two diagonal line pattern may indicate cells with a number of video session between 31-70 video sessions. In addition, squares 255-265 with a cross hatching pattern may indicate cells with over 71 video sessions.

Figure 3:
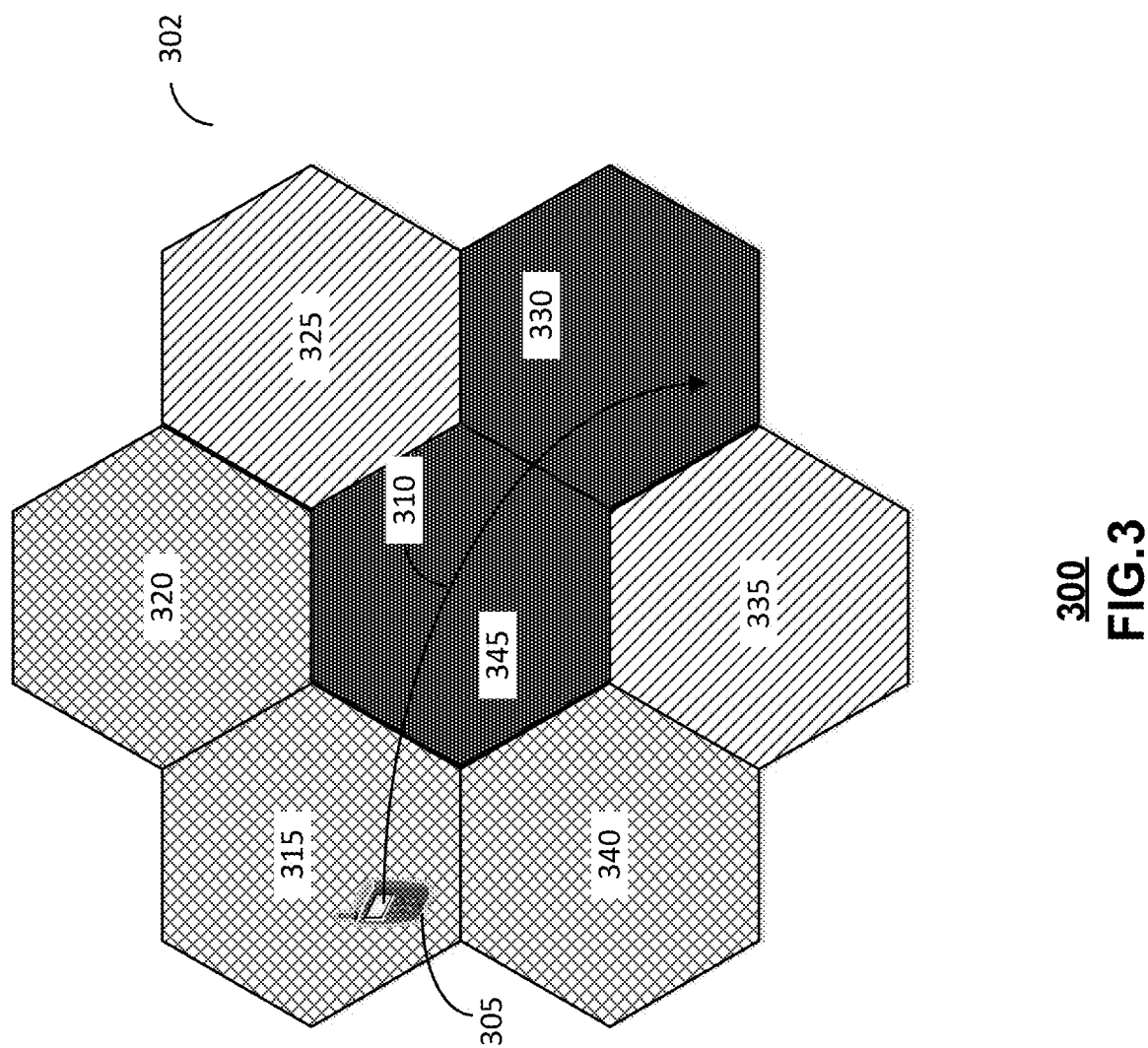

FIG. 3 depicts an illustrative embodiment for managing video sessions in a network based on network performance information. In one or more embodiments, the system 300 can include a network server that can generate a cluster of shapes (e.g. hexagons) to represent a cluster of cells 302 on a graphical map 105. Further, the congestion of each cell 315-345, according to an overall video traffic metric, can be indicated by a pattern as described in discussing FIG. 2. Further, the cluster of cells 302 can indicate a mobile device 305 traversing a portion of the cells 315-345.

In one or more embodiments, the system 300 can receive network information regarding a mobile device such as a call detail record (CDR) that indicates a travel trajectory 310 of the mobile device 305. Further, the trajectory 310 can be determined by personal information of the mobile device user. For example, the network server can determine that the mobile device user may be traveling home from work because the time of day is evening rush hour (e.g. 5 pm-7 pm) and in the past the mobile device 305 trajectory 310 is along a commuter bus route that the user has traveled regularly during evening rush hour.

In one or more embodiments, the trajectory 310 of the mobile device 305 can be provided with the graphical map, by the network server, to either the mobile device for viewing by the user or to a communication device for viewing by a network operator. Further, an indication can be given, by the network server, with the graphical map 105 that the mobile device 305 is entering a congested cell 345 but can connect to one of two neighboring cells 325, 335 that are less congested (e.g. congestion of cells determined according to the overall video traffic metric). However, due to the trajectory 310 on the graphical map, the user or the network operator can make an informed decision on whether to request a handover of control of mobile device to cell 335 or 325. Examining the trajectory 310 indicates that performing a handover of control of mobile device 305 from cell 345 to cell 335 can be better choice as the trajectory 310 brings mobile device 305 closer cell 335 than to cell 325. Thus, the user or the network operator can send a request to the network server to perform or cause to perform a handover of control of mobile device 305 from a base station of cell 345 to a base station of cell 335.

In one or more embodiments, the network server can analyze the data used in generating the cell cluster 302 for graphical map 105 and identifying the trajectory 310. The network server can automatically (without user or network operator input) perform or cause to perform a handover of control of the mobile device 305 from a base station of cell 345 to a base station of cell 335 because the network server has determined that the distance between cell 335 to the trajectory 310 is shorter than the distance between cell 325 and the trajectory 310.

Figure 4:
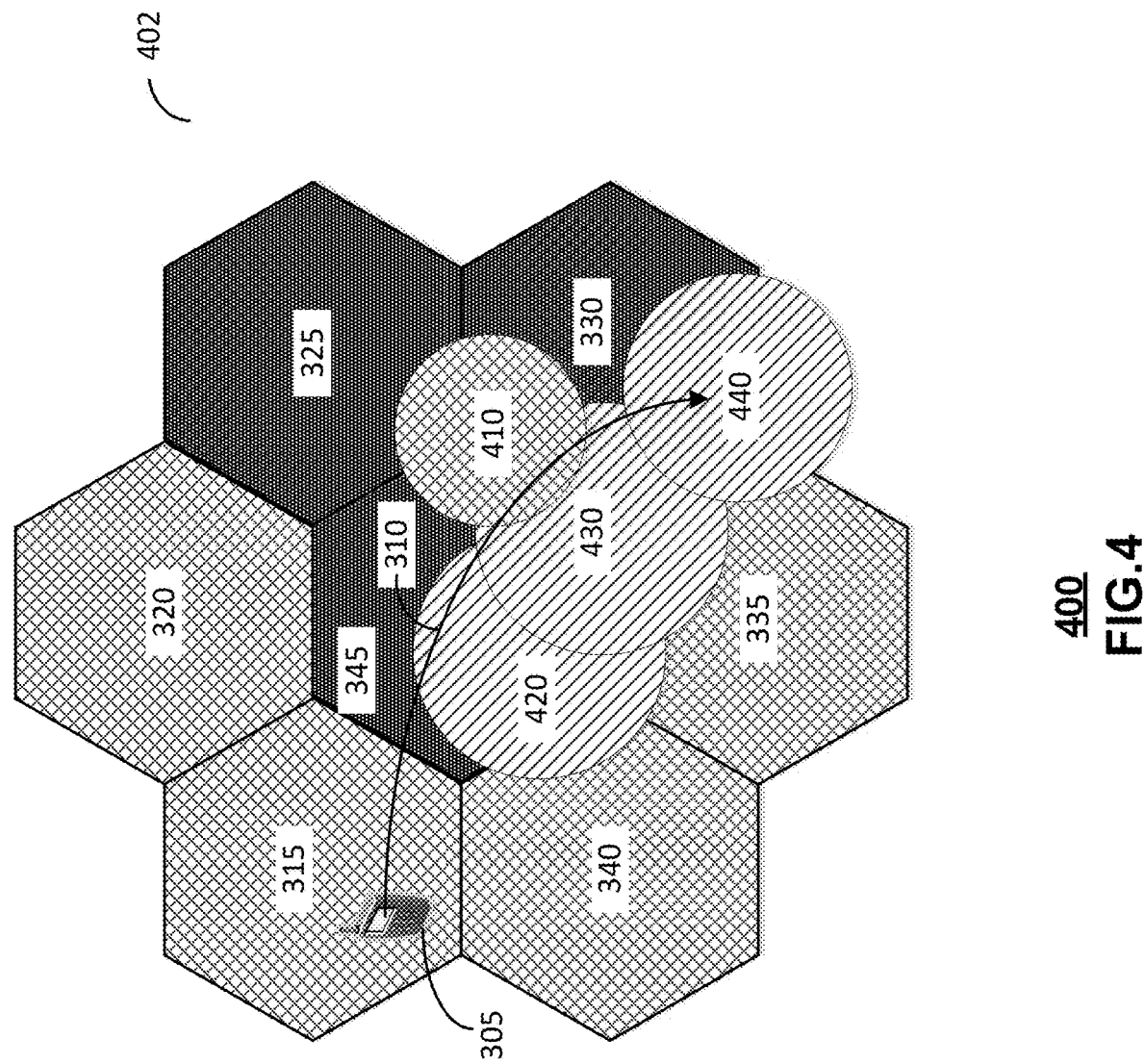

FIG. 4 depicts an illustrative embodiment for managing video sessions in a network based on network performance information. In one or more embodiments, a network server of system 400 can generate a cluster of shapes (e.g. hexagons, circles, etc.) to represent a cluster of cells and wireless networks 402 on a graphical map 105 (similar to the cluster of cells 302 in FIG. 3). Further, the congestion (according to an overall video traffic metric) of each cell 315-345 can be indicated by a pattern as described in discussing FIG. 2. Further, the cluster of cells and wireless networks 402 can indicate a mobile device 305 traversing portion of the cells 315-345. In addition, to the shapes representing each cell 315-345 (e.g. hexagons), the system 400 can present on the graphical map 105 shapes (e.g. circles) representing other networks 410-440 that can be connected to mobile device 305. For example, networks 410-440 can be wireless networks such as WiFi networks. Further, in some embodiments, each circle representing wireless network 410-410 can have a pattern to indicate a range of congestion according to a wireless traffic metric the same as or similar to the overall video traffic metric for the cells 315-340. In other embodiments wireless traffic metric can different than the overall video traffic metric for the cells 315-340. In some embodiments, a pattern for a cell and the same pattern for a wireless network can indicate the same range of congestion according to the overall video traffic metric/wireless traffic metric (as may be the case when the overall video traffic metric and wireless traffic metric are the same or similar). In other embodiments, a pattern for a cell can indicate one range of congestion and the same pattern for a wireless network can indicate a different range of congestion (as may be the case when the overall video traffic metric and wireless traffic metric are different).

In one or more embodiments, congestion of the cluster of cells and wireless networks 402 are indicated according to the same metric (e.g. number of video sessions). Further, a shape (e.g. hexagon or circle) with a single diagonal line pattern indicates a number of video sessions in a cell or wireless network to be 0-30 video sessions. A shape with two diagonal line pattern indicates a number of video sessions in a cell or wireless network to be 31-70 video sessions. A shape with a cross hatching pattern indicates a number of video sessions in a cell or wireless network to be over 70 video sessions.

In one or more embodiments, the graphical map 105 with cluster of cells and wireless networks 402 can be sent to a network operator's communication device or user's mobile device 305. Reviewing the graphical map, the network operator or user can determine that cells 345 and 330 on the trajectory of mobile device 305 are congested with over 70 video sessions in each cell. Further, cell 335 has an intermediate level of congestion with the number of video sessions between 31-70 video sessions. However, wireless networks 420-440 have a relatively lower congestion level than any cell, with a number of video sessions between 0-30 video sessions. Thus, in some embodiments, a network operator may send a message, via the communication device, to a network server of system 400, indicating to send a request to mobile device 305 to connect with the wireless networks 420-440 once each wireless network is within range of mobile device 305. Further, the mobile device 305 can be programmed, by user, or the network server, to automatically connect to the wireless networks 420-440 when in range. In other embodiments, the user may send a message, via the mobile device 305, to the network server indicating that the mobile device 305 is connecting to the wireless networks 420-440 once mobile device 305 is within range of each wireless network.

In one or more embodiments, the graphical map 105 presenting cluster of cells and wireless networks 402 shows that although the wireless network 410 may be in range of mobile device 305 as it traverses the trajectory 310, the network operator, user, or network server, may not connect mobile device 305 to wireless network 410. The reason may be that mobile device 305 can also connect to wireless network 430 at the same time as wireless network 410. Wireless network 430 has less congestion than wireless network 410. Thus, any video session conducted when the mobile device 305 is connected to wireless network 430 would likely provide a better experience than a video session conducted when mobile device 305 is connected to wireless network 410.

Figure 5:
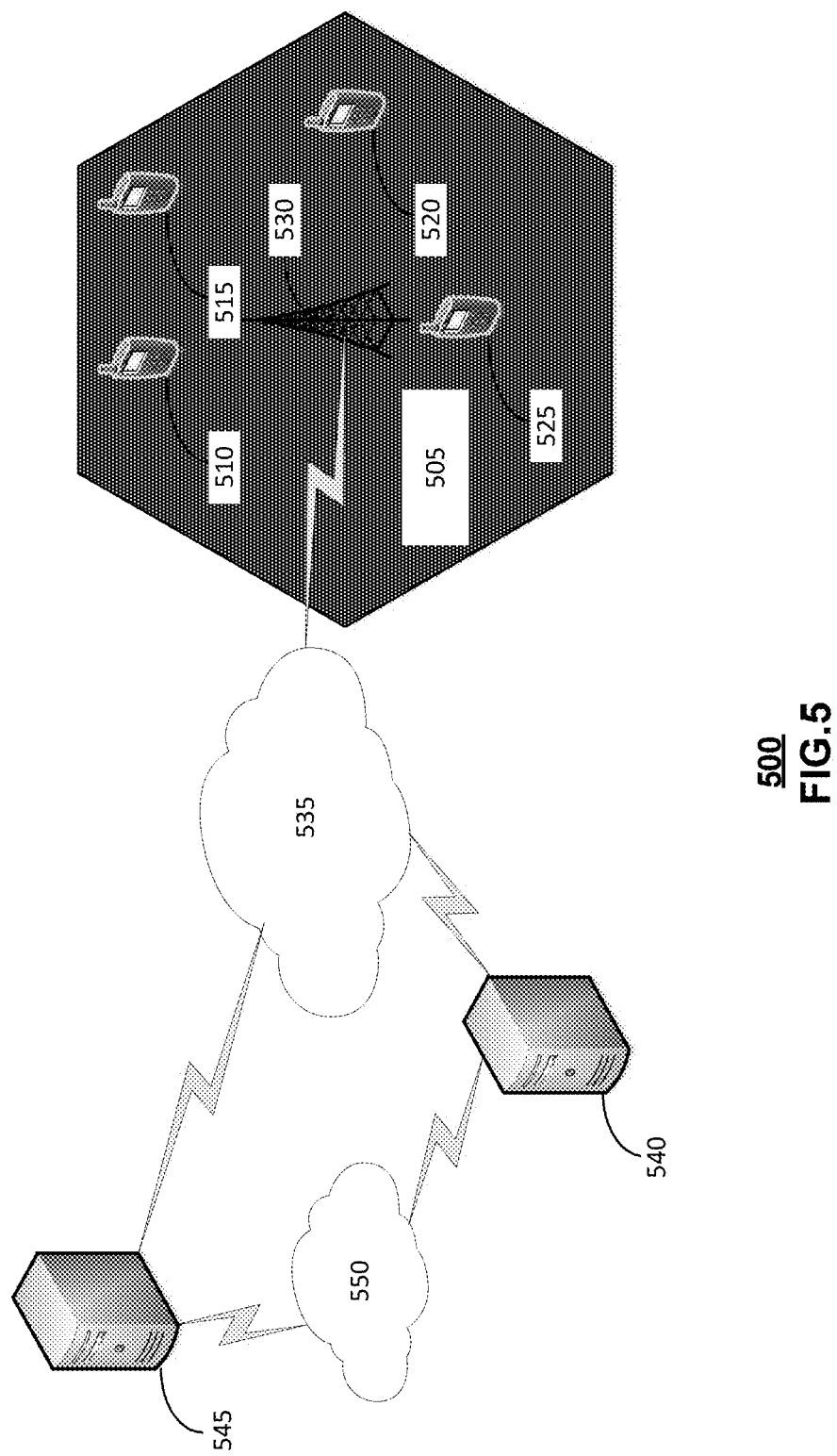

FIG. 5 depicts an illustrative embodiment for managing video sessions in a network based on network performance information. In one or more embodiments, the system 500 can include mobile devices 510-525 in a congested cell 505 (i.e. congested according to an overall video traffic metric). Further, a network server 540 may be coupled to a base station 530 for the cell 505 over communication network 535. In addition, a video content server 545 can provide video content for a video session conducted by each of the mobile devices 510-525. Also, the network server 540 can be communicate with video content server 545 over a communication network 550.

In one or more embodiments, the network server 540 can determine the video content provider for each of the video sessions conducted by the mobile devices 510-525 using network information provided by different data sources. In some embodiments, the video content provider can be discerned from the application type for each video session provided by the network information. Further, the network server 540 can determine an overall video traffic metric for the cell 505 and identifies that the overall video traffic metric indicates that the cell 505 has a high level of congestion. In addition, the network server 540 identifies, a based on the network information, that the video content provider is delivering video content at a high resolution for each of the video sessions conducted by the mobile devices 510-525. In response to identifying a high resolution video content, the video content provider, and a high level of congestion of the cell 505 (e.g. above a predetermined threshold), the network server 540 sends video content server 545 a request to deliver the video content for all or a portion of the video content delivered to the mobile devices 510-525 at a lower resolution, thereby decreasing the congestion of the cell 505.

Figure 6:
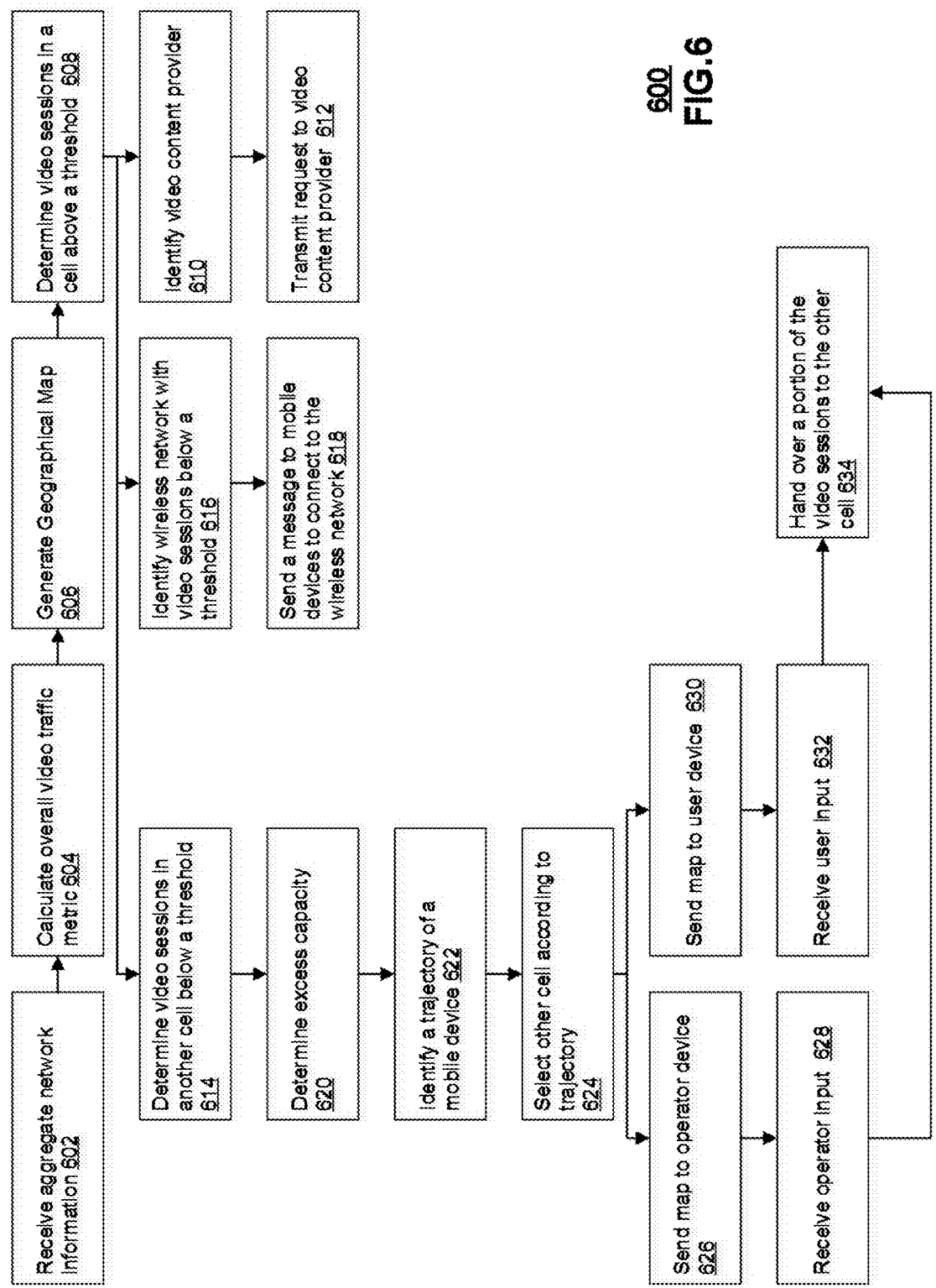
FIG. 6 depicts an illustrative embodiment of a method used in portions of the system described in FIGS. 1-5.

Note, the systems 100-400 can include a network server 540 to implements the functions of systems 100-400 discussed when describing FIGS. 1-4. FIG. 6 depicts an illustrative embodiment of a method 600 used by systems 100-500. The method 600 can include, at step 602, a network server 540 receiving aggregate network information for communication sessions for each cell of a multiple of cells in a cellular network. The communication sessions can include a group of video sessions. Also, the aggregate network information comprises network information from each of a multiple of data sources. In some embodiments, the aggregate network information is generated by linking and correlating data from the multiple data sources.

At a step 604, the method 600 further includes the network server 540 calculating an overall video traffic metric for the group of video sessions for each cell based on the aggregate network information. Additionally, the method 600, at step 606, includes generating a graphical map of the cellular network that displays a geography of the cellular network. The graphical map can also indicate the overall video traffic metric for the group of video sessions for each cell in the cellular network within the geography. At step 608, the method 600 also includes the network server 540 determining a first overall video traffic metric of a first group of video sessions controlled by a first base station of a first cell is above a first predetermined threshold.

At a step 610, the method 600 includes the network server 540 identifying a video content provider associated with a portion of the first group of video sessions. That is, the network server 540 identifies the video content provider delivering video content for each of the video sessions in the portion of the first group of video sessions based on the aggregate network information. The aggregate network information can include the application type used in conducting each video session. A video content provider can be identified according an application type (e.g. if Youtube™ application type, then video content provider is Google™, if Skype™ application type, then video content provider is Microsoft™, etc.). At a step 612, the method 600 can include the network server 540 transmitting a request to the video content provider. The request can indicate the video content provider to lower video resolution of each of the video sessions of the portion of the first group of video sessions.

The method 600, at step 616, includes the network server 540 identifying a first wireless network of multiple wireless networks. The first wireless network has a first wireless traffic metric below a second predetermined threshold. This identification can be in response to the network server 540 receiving aggregate wireless network information for each of the multiple wireless networks and then calculating a wireless traffic metric for each of the multiple wireless networks. In addition, in some embodiments, the network server 540 may re-generate the graphical map to include displaying a geography of the multiple wireless networks and indicating the wireless traffic metric or range of values for the wireless metric for each of the multiple wireless networks. In other embodiments, steps 614-616 are implemented prior to step 606 such that when generating the graphical map, the graphical map includes displaying a geography of the multiple wireless networks and indicating the wireless traffic metric or range of values for the wireless metric for each of the multiple wireless networks. The method 600, at a step 618, can include the network server 540 sending a message to each of a multiple of mobile devices. Each mobile device is conducting a video session in the first cell, and the message indicates a mobile device to connect to the first wireless network to conduct the video session. In response to receiving the message, a user of a mobile device can provision the mobile device to connect to the first wireless network.

At a step 614, the method 600 further includes the network server 540 determining a second overall video traffic metric of a second group of video sessions controlled by a second base station of a second cell is below the first predetermined threshold. Further, at a step 620, the method 600 includes the network server 540 calculating an excess capacity of the second cell as a difference between the second overall video traffic metric and the first predetermined threshold and the network server 540 and determining an overall video traffic metric of the first portion of the first group of video sessions is less than the excess capacity. Method 600, at step 622, can include the network server 540 identifying a trajectory of mobile device conducting a video session of the first portion of the first group of video sessions. In addition, the method 600, at step 624, can include the network server 540 selecting the second cell according to the trajectory of the mobile device.

At step 626, the method 600 includes the network server 540 sending the graphical map to an operator's communication device and an indication that the first overall video traffic metric associated with first cell is above the first predetermined threshold and the second overall video traffic metric associated with the second cell is below the first predetermined threshold. At step 628, the method 600 includes the network server 540 receiving a message from the operator's communication device. The message provides an indication to change (or cause the change of) control of the first portion of the first group of video session from the first base station to the second base station.

At step 630, the method 600 includes the network server 540 sending the graphical map to a user's mobile device and an indication that the first overall video traffic metric associated with first cell is above the first predetermined threshold and the second overall video traffic metric associated with the second cell is below the first predetermined threshold. At step 632, the method 600 includes the network server 540 receiving a message from the user's mobile device. The message provides an indication to change control of the first portion of the first group of video session from the first base station to the second base station. At a step 634, the method 600 includes the network server 540 performing or causing to perform a handover of control of a first portion of the first group of video sessions from the first base station to the second base station. Causing to perform a handover can include providing instructions for a network device (including for the network server 540) to perform the handovers of control as described herein.

While for purposes of simplicity of explanation, the respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
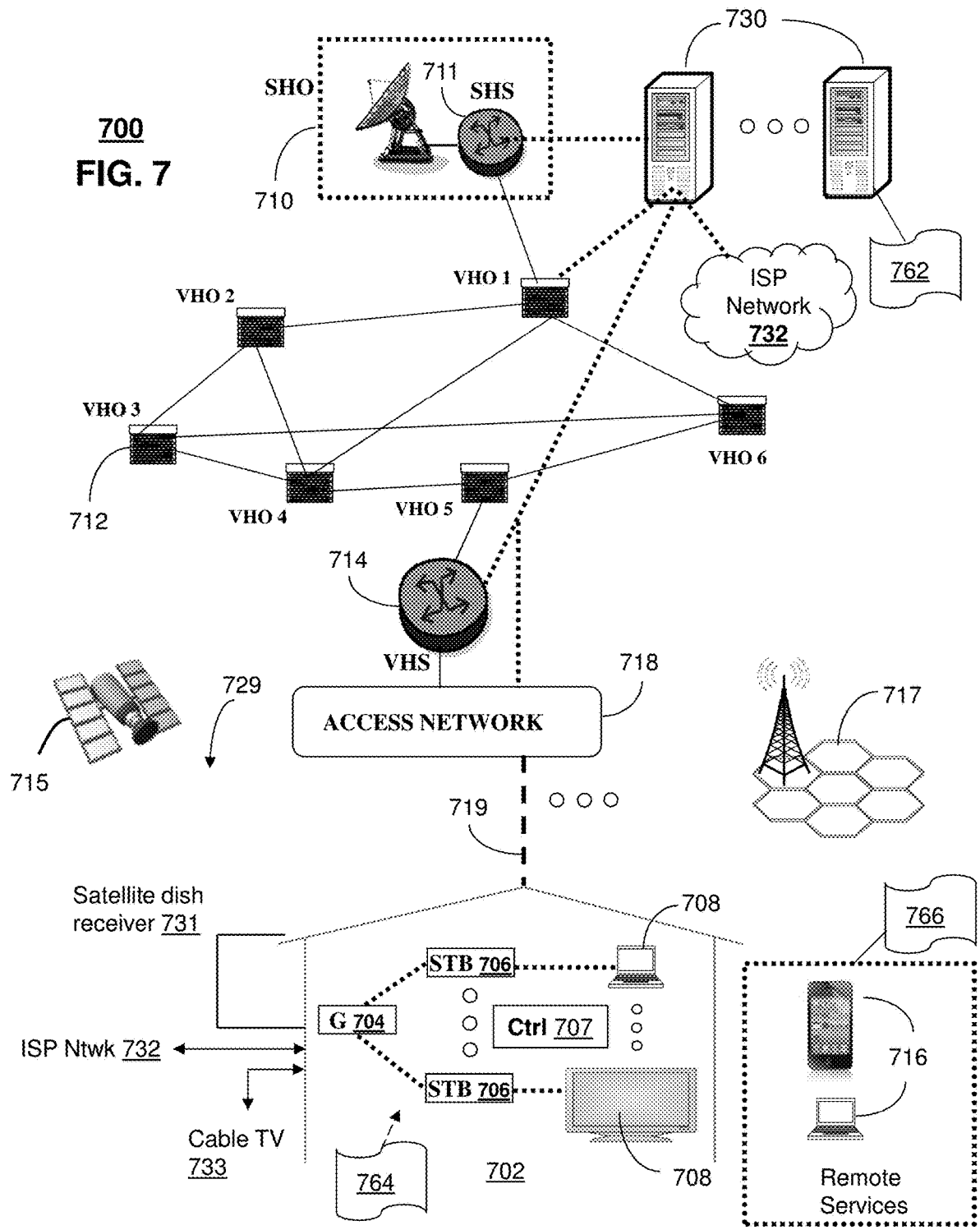
FIGS. 7-8 depict illustrative embodiments of communication systems that provide media services such as delivering and managing video content for video sessions conducted on mobile devices.

FIG. 7 depicts an illustrative embodiment of a communication system 700 for providing various communication services, such as delivering media or video content. The communication system 700 can represent an interactive media network, such as an interactive television system (e.g., an Internet Protocol Television (IPTV) media system). Communication system 700 can be overlaid or operably coupled with systems 100, 200, 300, 400, 500 of FIGS. 1-5 as another representative embodiment of communication system 700. For instance, one or more devices illustrated in the communication system 700 of FIG. 7 can be used for managing video sessions in a network based on network information. Embodiments of communication system 700 can include network server 730 receiving aggregate network information for communication sessions for each cell of a multiple of cells in a cellular network. The communication sessions include a group of video sessions and the aggregate network information comprises network information from each of a multiple of data sources. Further embodiments can include the network server 730 calculating an overall video traffic metric for the group of video sessions for each cell based on the aggregate network information. Additional embodiments can include the network server 730 determining a first overall video traffic metric of a first group of video sessions controlled by a first base station of a first cell is above a first predetermined threshold and a second overall video traffic metric of a second group of video sessions controlled by a second base station of a second cell is below the first predetermined threshold. Also, embodiments can include network server 730 generating a graphical map of the cellular network that displays a geography of the cellular network and indicates the overall video traffic metric for the group of video sessions for each cell in the cellular network. Further embodiments include the network server 730 sending the graphical map to a communication device conducting a video session in the first cell and an indication that the first overall video traffic metric associated with first cell is above the first predetermined threshold and the second overall video traffic metric associated with the second cell is below the first predetermined threshold.

In one or more embodiments, the communication system 700 can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol. The VHS 714 can distribute multimedia broadcast content via an access network 718 to commercial and/or residential buildings 702 housing a gateway 704 (such as a residential or commercial gateway).

The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a network management server (herein referred to as network server 730). The network server 730 can use computing and communication technology to perform function 762, which can include among other things, the video session management techniques described by method 600 of FIG. 6. For instance, function 762 of server 730 can be similar to the functions described for network server 540 of FIG. 5 in accordance with method 600. The media processors 706 and wireless communication devices 716 can be provisioned with software functions 764 and 766, respectively, to utilize the services of network server 730. For instance, functions 764 and 766 of media processors 706 and wireless communication devices 716 can be similar to the functions described for the communication devices or mobile devices 305, 510-515 or a network operator communication device discussed when describing FIGS. 1-5 in accordance with method 600 of FIG. 6.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
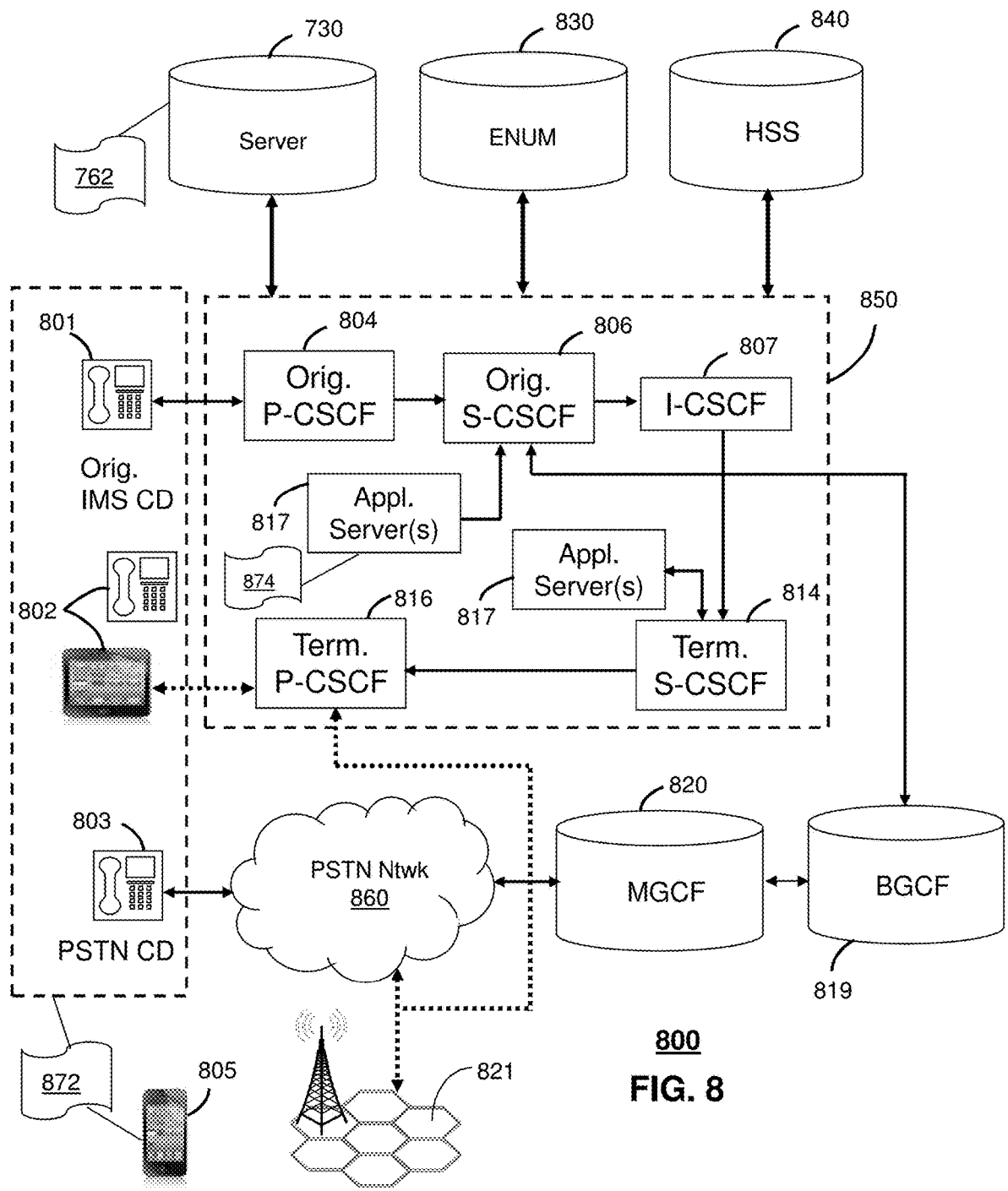

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with systems 100, 200, 300, 400, 500 of FIGS. 1-5 and communication system 700 as another representative embodiment of communication system 700.

Embodiments of a communication system 800 can include network server 730 receiving aggregate network information for communication sessions for each cell of a plurality of cells in a cellular network, wherein the communication sessions include a group of video sessions, and wherein the aggregate network information comprises network information from each of a plurality of data sources.

Further embodiments can include network server 730 calculating an overall video traffic metric for the group of video sessions for each cell based on the aggregate network information. Additional embodiments can include network server 730 generating a graphical map of the cellular network that displays a geography of the cellular network and indicates the overall video traffic metric for the group of video sessions for each cell in the cellular network within the geography. Also, embodiments can include network server 730 determining a first overall video traffic metric of a first group of video sessions controlled by a first base station of a first cell is above a first predetermined threshold and a second overall video traffic metric of a second group of video sessions controlled by a second base station of a second cell is below the first predetermined threshold. Further embodiments can include network server 730 sending the graphical map to a communication device and an indication that the first overall video traffic metric associated with first cell is above the first predetermined threshold and the second overall video traffic metric associated with the second cell is below the first predetermined threshold. Additional embodiments can include network server 730 performing or causing to perform a handover of control of a first portion of the first group of video sessions from the first base station to the second base station responsive to receiving a message from the communication device, wherein the message provides an indication to change control of the first portion of the first group of video session from the first base station to the second base station.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The network server 730 of FIG. 7 can be operably coupled to communication system 800 for purposes similar to those described above. Network server 730 can perform function 762 and thereby provide video session management services to the CDs 801, 802, 803 and 805 of FIG. 8 similar to the functions described for systems 100, 200, 300, 400 of FIGS. 1-4 and network server 540 of FIG. 5 in accordance with method 600 of FIG. 6. CDs 801, 802, 803 and 805, which can be adapted with software to perform function 874 to utilize the services of the network server 730 similar to the functions described for communication devices 305, 510-525 and network operator communication device of FIGS. 1-5 in accordance with method 600 of FIG. 6. Network server 730 can be an integral part of the application server(s) 817 performing function 874, which can be substantially similar to function 762 and adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
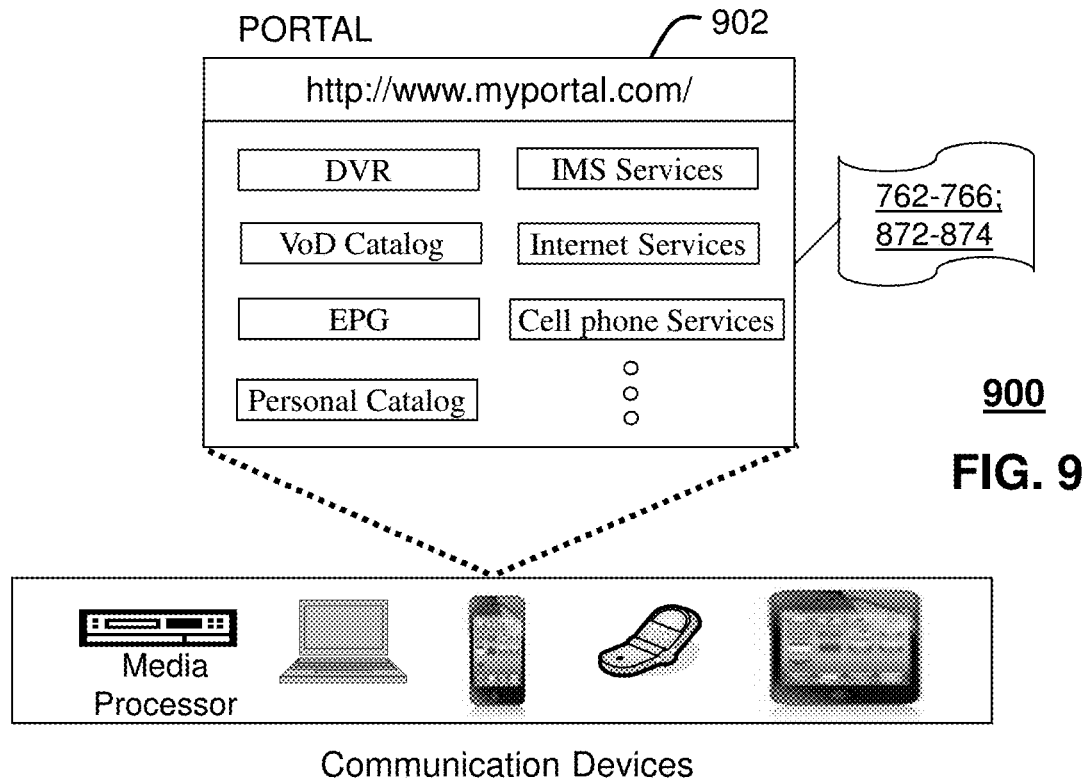
FIG. 9 depicts an illustrative embodiment of a web portal for interacting with the communication systems of FIGS. 1-5, and FIGS. 7-8]

FIG. 9 depicts an illustrative embodiment of a web portal 902 of a communication system 900. Communication system 900 can be overlaid or operably coupled with systems 100, 200, 300, 400, 500 of FIGS. 1-5, communication system 700, and/or communication system 800 as another representative embodiment of systems 100, 200, 300, 400, 500 of FIGS. 1-5, communication system 700, and/or communication system 800. The web portal 902 can be used for managing services of systems 100, 200, 300, 400, 500 of FIGS. 1-5 and communication systems 700-800. A web page of the web portal 902 can be accessed by a Uniform Resource Locator (URL) with an Internet browser using an Internet-capable communication device such as those described in FIGS. 1-5 and FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications 762-766, and 872-874 to adapt these applications as may be desired by subscribers and/or service providers of systems 100, 200, 300, 400, 500 of FIGS. 1-5, and communication systems 700-800. For instance, a user of the video session management services provided by network server 540 or network server 730 can log into their on-line accounts and provision the network server 540 or network server 730 to configure to connect their mobile device from a congested cell in a cellular network to a less congested cell in the cellular network. Further, a user can configure to connect their mobile device to one or more wireless (e.g. WiFi) networks on a certain trajectory (e.g. commuter train route during evening rush hour) such that the mobile device automatically connects to these networks when their mobile device is in range of these networks. In addition, the user can send a request to a video content provider that is providing video content for the video session they are conducting on their mobile device to lower the resolution of the video content to relieve congestion of the cell to which their mobile device is connected.

Also, a network operator, through their communication device, can provision the predetermined thresholds, or range of values to indicate congestion of cells and wireless networks on the graphical map 105 using portal 902. Further, a network operator from their communication device can connect a mobile device from a congested cell in a cellular network to a less congested cell in the cellular network. Further, the network operator from their communication device can configure to connect a mobile device to one or more wireless (e.g. WiFi) networks on a certain trajectory (e.g. commuter train route during evening rush hour) such that the mobile device (in some embodiments automatically) connects to these networks when the mobile device is in range of these networks. In addition, the network operator through their communication device can send a request to a video content provider that is providing video content for the video session conducted on a mobile device to lower the resolution of the video content to relieve congestion of the cell to which their mobile device is connected.

Figure 10:
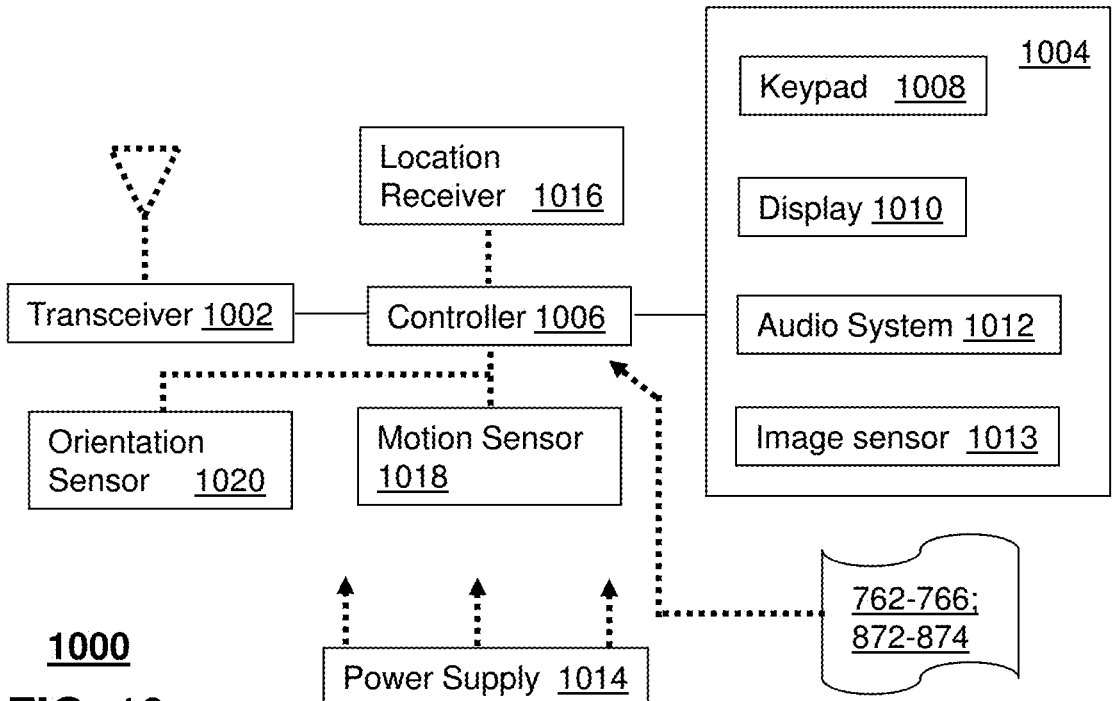
FIG. 10 depicts an illustrative embodiment of a communication device.

FIG. 10 depicts an illustrative embodiment of a communication device 1000. Communication device 1000 can serve in whole or in part as an illustrative embodiment of the devices depicted described in conjunction with FIGS. 1-5, and FIGS. 7-8 and can be configured to perform portions of method 600 of FIG. 6.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of mobile devices 305, 510-525, the servers described in conjunction with systems 100, 200, 300, 400, 500, communication device of a network operator, network server 540, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can operate in systems 100, 200, 300, 400, 500, of FIGS. 1-5, communication systems 700-800 of FIGS. 7-8 such as a gaming console and a media player. In addition, the controller 1006 can be adapted in various embodiments to perform the functions 762-766 and 872-874, respectively.

Upon reviewing the aforementioned embodiments, it would be evident to an artisan with ordinary skill in the art that said embodiments can be modified, reduced, or enhanced without departing from the scope of the claims described below. For example, portions or entire embodiments can be combined with other portions of other embodiments or combined with other entire embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
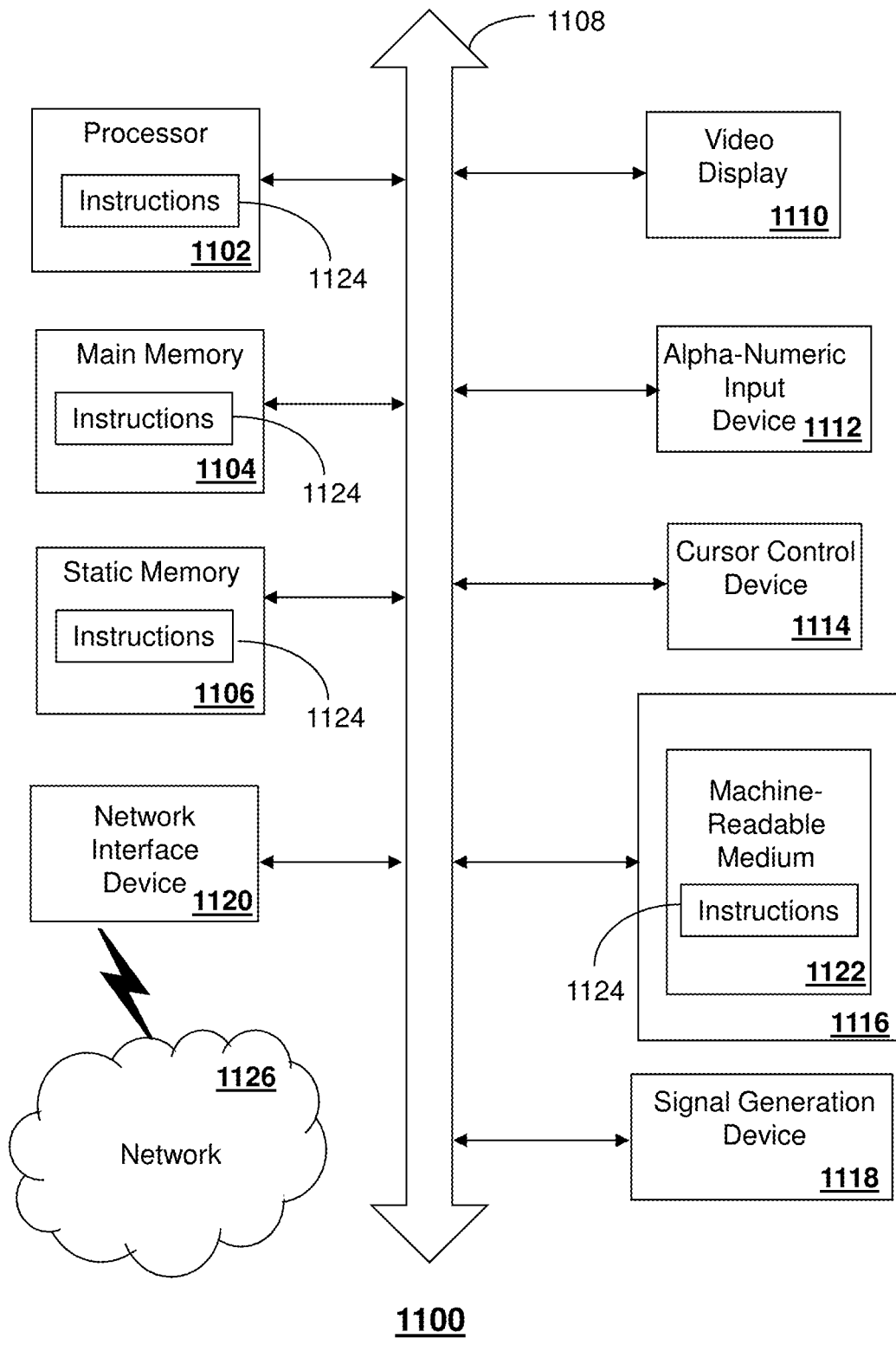
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the network server 730, the media processor 706, mobile devices 305, 510-525, the servers described in conjunction with systems 100, 200, 300, 400, 500, communication device of a network operator, network server 540, and other devices described in conjunction with FIGS. 1-10. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
receiving network information for communication sessions for a plurality of cells in a cellular network;
generating a graphical map of the cellular network that displays a geography of the cellular network and graphical indications of a plurality of video traffic congestion metrics of video traffic sessions of the plurality of cells and of one or more wireless networks within the geography;
determining, for a first cell of the plurality of cells, according to the graphical indications of the plurality of video traffic congestions metrics, that a first video traffic congestion metric of the plurality of video traffic congestion metrics is above a first predetermined threshold and, for a second cell of the plurality of cells, that a second video traffic congestion metric of the plurality of video traffic congestion metrics is below the first predetermined threshold;
determining a trajectory of a mobile device to obtain a determined trajectory, wherein the determining of the trajectory comprises accessing historical travel information associated with the mobile device based on time of day and determining the trajectory according to the historical travel information;
overlaying the determined trajectory and the graphical map to obtain a modified graphical map;
identifying another wireless network proximal to the determined trajectory of the mobile device from the one or more wireless networks within the geography of the modified graphical map, wherein the graphical map displays a graphical indication of a congestion metric of the another wireless network is below the first predetermined threshold;
sending the graphical map to the mobile device for presentation at a user display of the mobile device;
receiving from the mobile device a selection between the another wireless network and the second cell to carry video traffic of the mobile device according to the determined trajectory of the mobile device of the modified graphical map;
calculating an excess capacity of the second cell as a difference between the second video traffic congestion metric and the first predetermined threshold;
identifying a service provider based on an application type provided by the plurality of video traffic congestion metrics; and
requesting the service provider to adjust a video service responsive to the plurality of video traffic congestion metrics.

2. The device of claim 1, wherein the operations further comprise:
calculating an excess capacity of the second cell as a difference between the second video traffic congestion metric and the first predetermined threshold.

3. The device of claim 1, wherein the operations further comprise:
receiving aggregate wireless network information for each of a plurality of wireless networks comprising the another wireless network;
calculating a wireless traffic congestion metric for each of the plurality of wireless networks, wherein the generating of the graphical map further comprises:
displaying a geography of the plurality of wireless networks; and
providing graphical indications of the wireless traffic congestion metric for each of the plurality of wireless networks.

4. The device of claim 3, wherein the operations further comprise:
identifying the another wireless network of the plurality of wireless networks, wherein the another wireless network has a first wireless traffic congestion metric below a second predetermined threshold, and wherein the plurality of video traffic congestion metrics are selected from a group consisting of a number of video sessions, a data throughput, a transfer duration, a video quality, an application type, an operating system type, a buffering value, a startup delay, a quality switching, a network type, and any combination thereof.

5. The device of claim 4, wherein the first predetermined threshold comprises a threshold number of video sessions, wherein the video traffic congestion metric comprises a current number of video sessions, wherein the operations further comprise sending a message to each of a plurality of mobile devices, wherein each of the plurality of mobile devices is conducting a video session in the first cell, and wherein the message indicates the mobile device to connect to a first wireless network to conduct the video session.

6. The device of claim 1, wherein the operations further comprise sending a message to each of a plurality of mobile devices, wherein each mobile device of the plurality of mobile devices is conducting a video session in the first cell, and wherein the message indicates each mobile device to send a request to a video content provider associated with the video session to lower resolution of the video session.

7. The device of claim 1, wherein each of the one or more wireless networks use a WiFi protocol.

8. The device of claim 1, wherein the operations further comprise sending, to a communication device, the graphical map and a first indication that the first video traffic congestion metric associated with the first cell is above the first predetermined threshold and the second video traffic congestion metric associated with the second cell is below the first predetermined threshold.

9. A non-transitory machine-readable storage medium, comprising executable instructions that, when executed by a processing system including a processor, facilitate performance of operations, the operations comprising:
  obtaining network information for communication sessions for a plurality of cells in a cellular network;
  determining for a first cell of the plurality of cells that a first video traffic congestion metric of a plurality of video traffic congestion metrics of the plurality of cells and one or more wireless networks is above a first predetermined threshold and for a second cell of the plurality of cells a second video traffic congestion metric of the plurality of video traffic congestion metrics is below the first predetermined threshold;
  identifying a trajectory of a mobile device to obtain an identified trajectory, wherein the identifying the trajectory comprises accessing historical travel information associated with the mobile device based on time of day and determining the identified trajectory according to the historical travel information;
  identifying the one or more wireless networks on the identified trajectory of the mobile device;
  generating a graphical map of the cellular network that displays a geography of the cellular network, the one or more wireless networks proximal to the identified trajectory of the mobile device, the plurality of video traffic congestion metrics of the plurality of cells and the one or more wireless networks;
  overlaying the identified trajectory and the graphical map to obtain a modified graphical map;
  sending, to the mobile device, the modified graphical map for presentation at a user display of the mobile device;
  receiving from the mobile device, a selection between the one or more wireless networks and the second cell to carry video traffic of the mobile device responsive to the presentation of the modified graphical map at the user display of the mobile device;
  calculating an excess capacity of the second cell as a difference between the second video traffic congestion metric and the first predetermined threshold;
  identifying a service provider based on an application type provided by the plurality of video traffic congestion metrics; and
  requesting the service provider to adjust a video service responsive to the plurality of video traffic congestion metrics.

10. The non-transitory machine-readable storage medium of claim 9, wherein the operations further comprise performing a handover of control of the mobile device from the first cell to the second cell responsive to receiving a message from the mobile device, wherein the message provides a second indication to change control of the mobile device from the first cell to the second cell.

11. The non-transitory machine-readable storage medium of claim 9, wherein the operations further comprise receiving a third indication that the mobile device is connected to a first wireless network to conduct a video session.

12. The non-transitory machine-readable storage medium of claim 9, wherein the operations further comprise sending a message to the mobile device and wherein the message indicates the mobile device to send a request to a video content provider to lower resolution of a video session.

13. The non-transitory machine-readable storage medium of claim 9, wherein the operations further comprise:
  identifying a video content provider associated with a video session; and
  transmitting a request to the video content provider, wherein the request indicates the video content provider to lower video resolution of the video session.

14. A method, comprising:
  receiving, by a processing system including a processor, network information for communication sessions for a plurality of cells in a cellular network;
  determining, by the processing system, that a first video traffic congestion metric of a first cell is above a first predetermined threshold and a second video traffic congestion metric of a second cell is below the first predetermined threshold;
  identifying, by the processing system, a trajectory of a mobile device to obtain an identified trajectory, wherein the identifying of the trajectory comprises accessing, by the processing system, historical travel information associated with the mobile device based on time of day and determining, by the processing system, the identified trajectory according to the historical travel information;
  identifying, by the processing system, one or more wireless networks proximal to the identified trajectory of the mobile device;
  generating, by the processing system, a graphical map of the cellular network that displays a geography of the cellular network the one or more wireless networks on the identified trajectory of the mobile device, and a plurality of video traffic congestion metrics of the plurality of cells and the one or more wireless networks, wherein the plurality of video traffic congestion metrics comprises the first and second video traffic congestion metrics;
  overlaying, by the processing system, the identified trajectory and the graphical map to obtain a modified graphical map;
  sending, by the processing system to the mobile device for presentation at a user display of the mobile device, the modified graphical map graphically portraying a first indication that the first video traffic congestion metric associated with the first cell is above the first predetermined threshold and a second indication that the second video traffic congestion metric associated with the second cell is below the first predetermined threshold;
  receiving, by the processing system, a selection from the mobile device between the one or more wireless networks and the second cell responsive to the presentation of the modified graphical map at the user display of the mobile device;

calculating, by the processing system, an excess capacity of the second cell as a difference between the second video traffic congestion metric and the first predetermined threshold;

identifying, by the processing system, a service provider based on an application type provided by the plurality of video traffic congestion metrics; and requesting, by the processing system, the service provider to adjust a video service responsive to the plurality of video traffic congestion metrics.

15. The method of claim 14, further comprising performing, by the processing system, a handover of control of the mobile device from the first cell to the second cell responsive to receiving a message from the mobile device, wherein the message provides a second indication to change control of the mobile device from the first cell to the second cell.

16. The method of claim 15, further comprising:
calculating, by the processing system, an excess capacity of the second cell as a difference between the second video traffic congestion metric and the first predetermined threshold.

17. The method of claim 14, further comprising receiving, by the processing system, a message from the mobile device, wherein the message indicates that the mobile device has sent a request to a video content provider associated with a video session to lower resolution of the video session.

18. The method of claim 14, wherein each of the one or more wireless networks use a WiFi protocol.

19. The method of claim 14, wherein the graphical map indicates a video traffic level of each of the one or more wireless networks.

20. The non-transitory machine-readable storage medium of claim 9, wherein a wireless network of the one or more wireless networks use a WiFi protocol.

* * * * *